US012659868B2

(12) United States Patent
Yuan et al.

(10) Patent No.: US 12,659,868 B2
(45) Date of Patent: Jun. 16, 2026

(54) TECHNIQUES FOR POWER CONTROL UNDER UNIFIED TRANSMISSION CONFIGURATION INDICATION

(71) Applicant: QUALCOMM Incorporated, San Diego, CA (US)

(72) Inventors: Fang Yuan, Beijing (CN); Yan Zhou, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 18/272,926

(22) PCT Filed: Mar. 31, 2021

(86) PCT No.: PCT/CN2021/084309
§ 371 (c)(1),
(2) Date: Jul. 18, 2023

(87) PCT Pub. No.: WO2022/205038
PCT Pub. Date: Oct. 6, 2022

(65) Prior Publication Data
US 2024/0089861 A1     Mar. 14, 2024

(51) Int. Cl.
*H04W 52/14*     (2009.01)
*H04L 5/00*      (2006.01)

(52) U.S. Cl.
CPC ......... *H04W 52/146* (2013.01); *H04L 5/0091* (2013.01)

(58) Field of Classification Search
CPC ............. H04W 52/146; H04W 52/242; H04W 52/246; H04W 52/327; H04L 5/0091; H04L 5/0094; H04L 5/0096
See application file for complete search history.

(56) References Cited

U.S. PATENT DOCUMENTS

2019/0109679 A1*  4/2019  Liu ...................... H04L 5/0048
2020/0205093 A1   6/2020  Kim et al.
(Continued)

FOREIGN PATENT DOCUMENTS

CN     110731104 A    1/2020
CN     111083773 A    4/2020
WO     2021028767 A1  2/2021

OTHER PUBLICATIONS

International Search Report and Written Opinion—PCT/CN2021/084309—ISA/EPO—Jan. 5, 2022.

*Primary Examiner* — John J Lee
(74) *Attorney, Agent, or Firm* — ArentFox Schiff, LLP

(57) ABSTRACT

Techniques for power control under unified transmission configuration indicator (TCI) state indication are provided. In an example, a base station may transmit to a user equipment (UE) first configuration information for beam indication of an uplink (UL) transmission and second configuration information for a power control parameter. The beam indication for the UL transmission may be indicated by a unified TCI state corresponding to the UL transmission. The UE may configure power control of the UL transmission based on the first configuration information and the second configuration information, and transmit, to the base station, the uplink transmission according to the configured power control.

30 Claims, 6 Drawing Sheets

500

502
Receiving, from a base station, first configuration information for beam indication of an uplink transmission and second configuration information for a power control parameter 504
Configuring power control of the uplink transmission based on the first configuration information and the second configuration information 506
Transmitting, to the base station, the uplink transmission

(56) References Cited

U.S. PATENT DOCUMENTS

| | | | |
|---|---|---|---|
| 2020/0244335 A1* | 7/2020 | Nilsson | H04B 7/0695 |
| 2020/0305088 A1 | 9/2020 | Nory et al. | |
| 2021/0029650 A1 | 1/2021 | Cirik et al. | |
| 2022/0295413 A1* | 9/2022 | Park | H04W 16/28 |
| 2023/0023719 A1* | 1/2023 | Ji | H04W 72/21 |

* cited by examiner

500

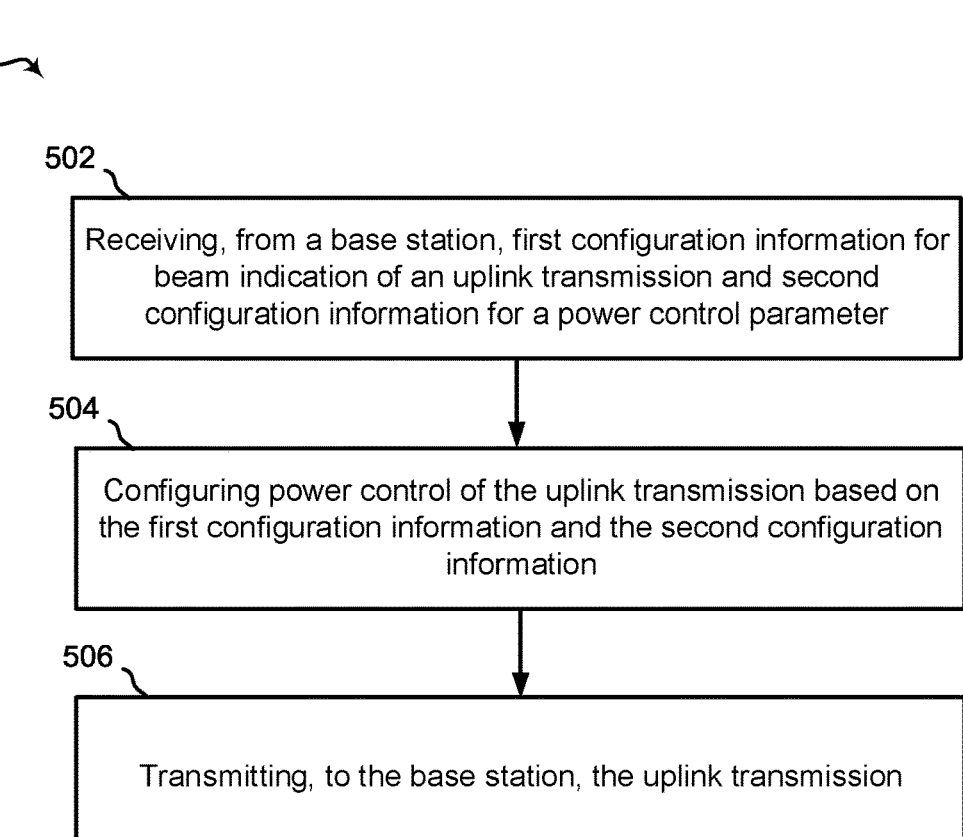

502

Receiving, from a base station, first configuration information for beam indication of an uplink transmission and second configuration information for a power control parameter

504

Configuring power control of the uplink transmission based on the first configuration information and the second configuration information

506

Transmitting, to the base station, the uplink transmission

Transmitting, to a UE, first configuration information for beam indication of an uplink transmission and second configuration information for a power control parameter

604

Receiving, from the UE, the uplink transmission in response to the first configuration information and the second configuration information

TECHNIQUES FOR POWER CONTROL UNDER UNIFIED TRANSMISSION CONFIGURATION INDICATION

CROSS-REFERENCE TO RELATED APPLICATIONS

This application is a 35 U.S.C. § 371 National Phase of PCT Application No. PCT/CN2021/084309, entitled "TECHNIQUES FOR POWER CONTROL UNDER UNIFIED TRANSMISSION CONFIGURATION INDICATION" and filed on Mar. 31, 2021, the disclosure of each of which is hereby incorporated by reference in its entirety.

TECHNICAL FIELD

Aspects of the present disclosure relate generally to wireless communications, and more particularly, to techniques for power control under unified transmission configuration indication (TCI).

BACKGROUND

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

Systems, methods, and apparatus presented herein each have several innovative aspects, no single one of which is solely responsible for the desirable attributes disclosed herein. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication for a user equipment (UE), is provided. The method may include receiving, from a base station, first configuration information for beam indication of an uplink transmission and second configuration information for a power control parameter, wherein the beam indication for the uplink transmission is indicated by a unified transmission configuration indicator (TCI) state corresponding to the uplink transmission. The method may include configuring power control of the uplink transmission based on the first configuration information and the second configuration information. The method may include transmitting, to the base station, the uplink transmission.

In another aspect, a UE is provided. The UE may include a memory comprising instructions, and one or more processors communicatively coupled with the memory. The one or more processors may be configured to receive, from a base station, first configuration information for beam indication of an uplink transmission and second configuration information for a power control parameter, wherein the beam indication for the uplink transmission is indicated by a unified TCI state corresponding to the uplink transmission. The one or more processors may be configured to configure power control of the uplink transmission based on the first configuration information and the second configuration information. The one or more processors may be configured to transmit, to the base station, the uplink transmission.

In another aspect, a method of wireless communication for a base station is provided. The method may include transmitting, to a UE, first configuration information for beam indication of an uplink transmission and second configuration information for a power control parameter, wherein the beam indication for the uplink transmission is indicated by a unified TCI state corresponding to the uplink transmission. The method may include receiving, from the UE, the uplink transmission in response to the first configuration information and the second configuration information.

In another aspect, a base station is provided. The base station may include a memory comprising instructions, and one or more processors communicatively coupled with the memory. The one or more processors may be configured to transmit, to a UE, first configuration information for beam indication of an uplink transmission and second configuration information for a power control parameter, wherein the beam indication for the uplink transmission is indicated by a unified TCI state corresponding to the uplink transmission. The one or more processors may also be configured to receive, from the UE, the uplink transmission in response to the first configuration information and the second configuration information.

In other aspects, apparatuses and computer-readable mediums for performing the above-disclosed methods are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 5 is flowchart of an example method performed by the UE of FIG. 1, according to aspects of the present disclosure.

DETAILED DESCRIPTION

Figure 1:
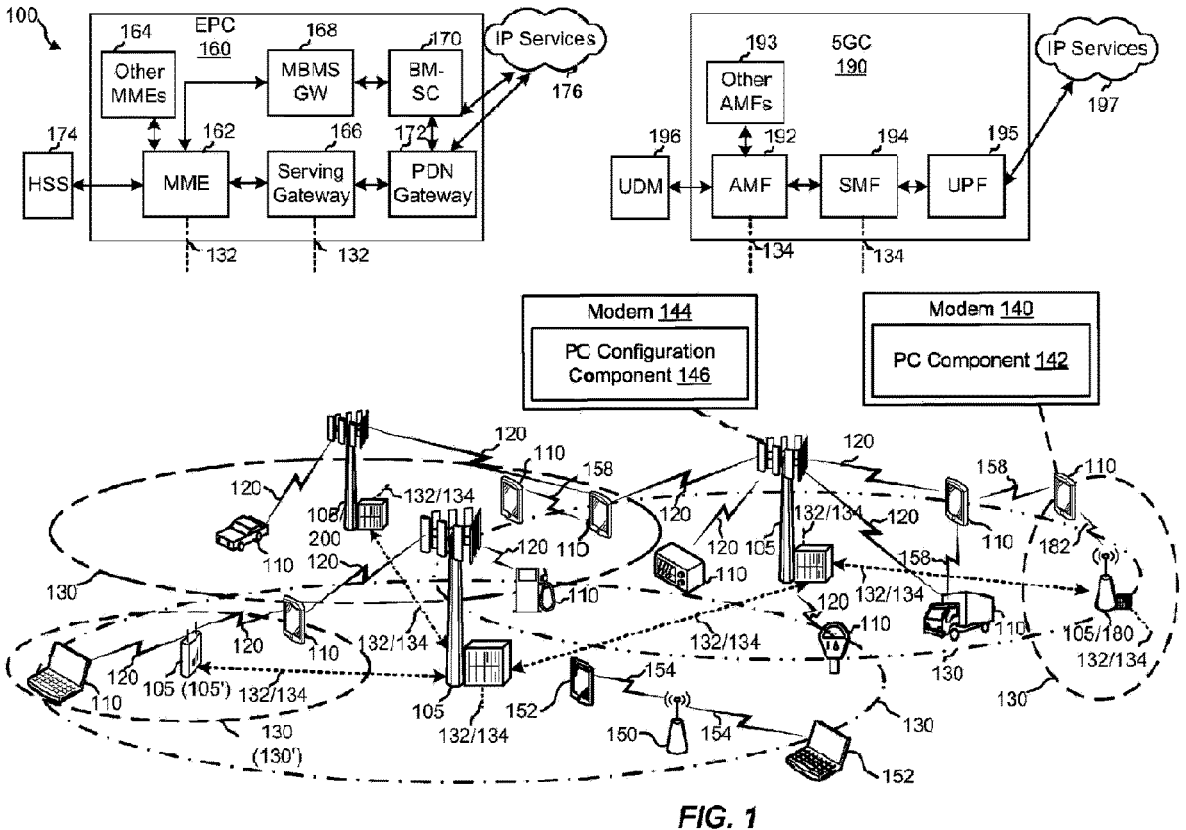
FIG. 1 is a diagram illustrating an example of a wireless communications system and an access network, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conventionally, beam indication for various uplink (UL) channels is indicated by unified transmission configuration indicator (TCI) states, and power control configuration is different for each of the UL channels. This may result in difficulty in associating power control configuration with the unified TCI states for different UL channels.

Aspects of the present disclosure provide techniques for power control under unified TCI state indication. In an example, a base station may transmit to a user equipment (UE) first configuration information for beam indication of a UL transmission and second configuration information for a power control parameter. The beam indication for the UL transmission may be indicated by a unified TCI state corresponding to the UL transmission. The UE may configure power control of the UL transmission based on the first configuration information and the second configuration information, and transmit, to the base station, the uplink transmission according to the configured power control.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Turning now to the figures, examples of systems, apparatus, and methods according to aspects of the present disclosure are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes at least one base station 105, at least one UE 110, at least one Evolved Packet Core (EPC) 160, and at least one 5G Core (5GC) 190. The base station 105 may include macro cells (high power cellular base station) and/or small cells (low power cellular base station). The macro cells include base stations. The small cells include femtocells, picocells, and microcells.

In some implementations, a UE 110 may include a modem 140 and/or a power control (PC) component 142 for configuring power control based on a unified TCI states and a type of uplink (UL) channel. Further, a base station 105 may include a modem 144 and/or a PC configuration component 146 for configuring one or more power control parameters of the UE 110 based on a unified TCI state and a type of UL channel.

A base station 105 may be configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, Zig-Bee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a repeater, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
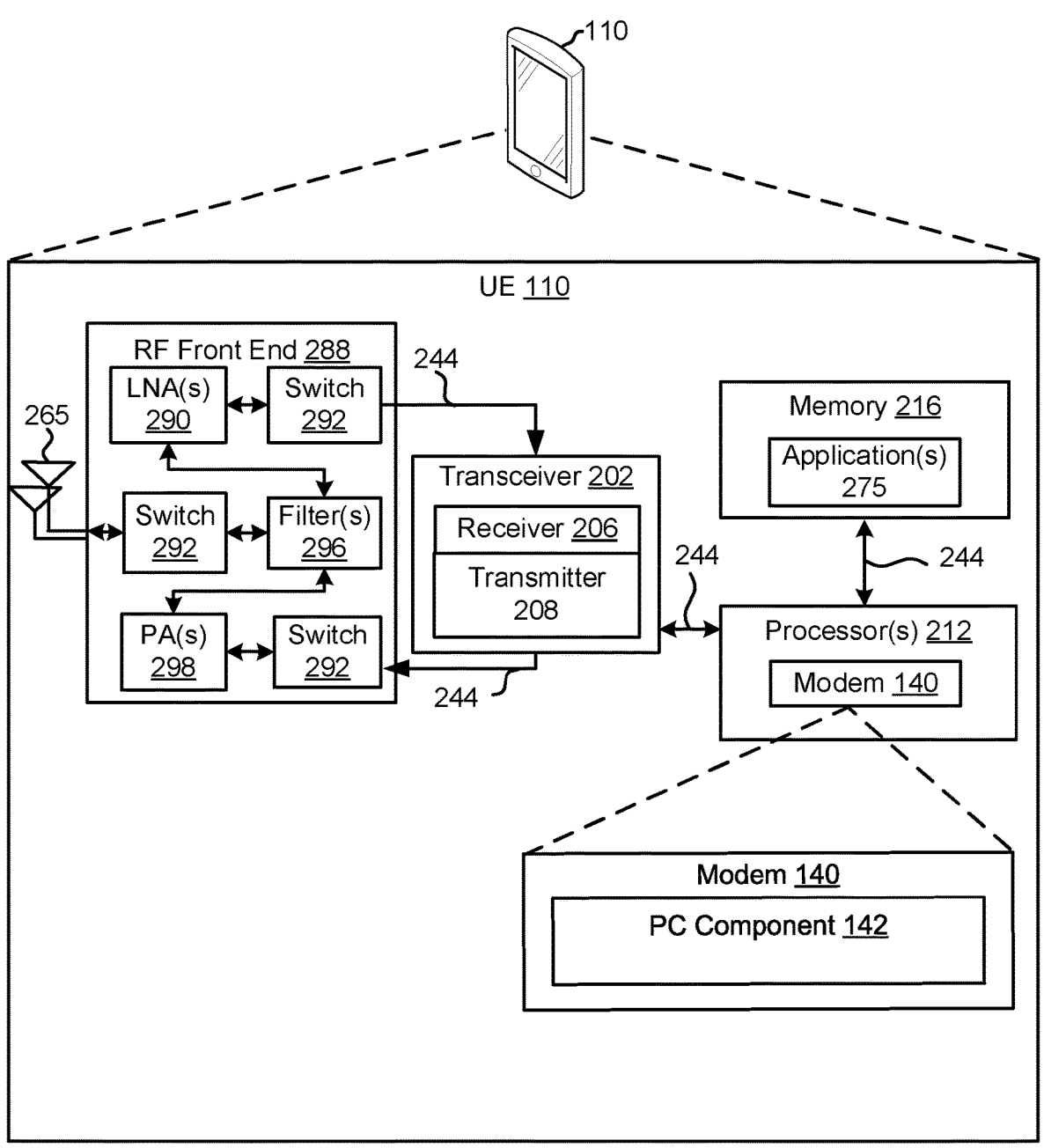
FIG. 2 is a schematic diagram of an example of a user equipment (UE) of FIG. 1, according to aspects of the present disclosure.

Referring to FIG. 2, an example implementation of a UE 110 may include the modem 140 having the PC component 142. The modem 140 and/or the PC component 142 of the UE 110 may be configured to configure power control based on a unified TCI state indication and a power control for different UL transmissions, as described in further detail herein.

In some implementations, the UE 110 may include a variety of components, including components such as one or more processors 212 and memory 216 and transceiver 202 in communication via one or more buses 244, which may operate in conjunction with the modem 140 and/or the PC component 142 to enable one or more of the functions related to power control under unified TCI state indication, described herein. Further, the one or more processors 212, modem 140, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 140 that uses one or more modem processors. The various functions related to the PC component 142 may be included in the modem 140 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 140 may configure the UE 110 along with the processors 212. In other aspects, some of the features of the one or more processors 212 and/or the modem 140 associated with the PC component 142 may be performed by the transceiver 202.

Also, the memory 216 may be configured to store data used herein and/or local versions of applications 275 or the PC component 142 and/or one or more subcomponents of the PC component 142 being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the PC component 142 and/or one or more of its subcomponents, and/or data associated therewith, when the UE 110 is operating at least one processor 212 to execute the PC component 142 and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one base station 105. The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the UE 110 may include the RF front end 288, which may operate in communication with one or more antennas 265 and the transceiver 202 for receiving and transmitting radio transmissions, for example, wireless communications transmitted by at least one base station 105 or wireless transmissions transmitted by the UE 110. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the UE 110 may communicate with, for example, one or more of the UEs 110, one or more of the base stations 105, or one or more cells associated with one or more of the base stations 105. In an aspect, for example, the modem 140 may configure the transceiver 202 to operate at a specified frequency and power level based on a control entity configuration of the UE 110 and the communication protocol used by the modem 140.

In an aspect, the modem 140 may be a multiband-multimode modem, which may process digital data and communicate with the transceiver 202 such that the digital data is sent and received using the transceiver 202. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the UE 110 (e.g., RF front end 288, transceiver 202) to enable transmission and/or reception of signals from the network based on a specified modem configuration. In an aspect, a modem configuration may be based on the mode of the modem 140 and the frequency band in use. In another aspect, the modem configuration may be based on control entity configuration information associated with the UE 110 as provided by the network (e.g., base station 105).

Figure 3:
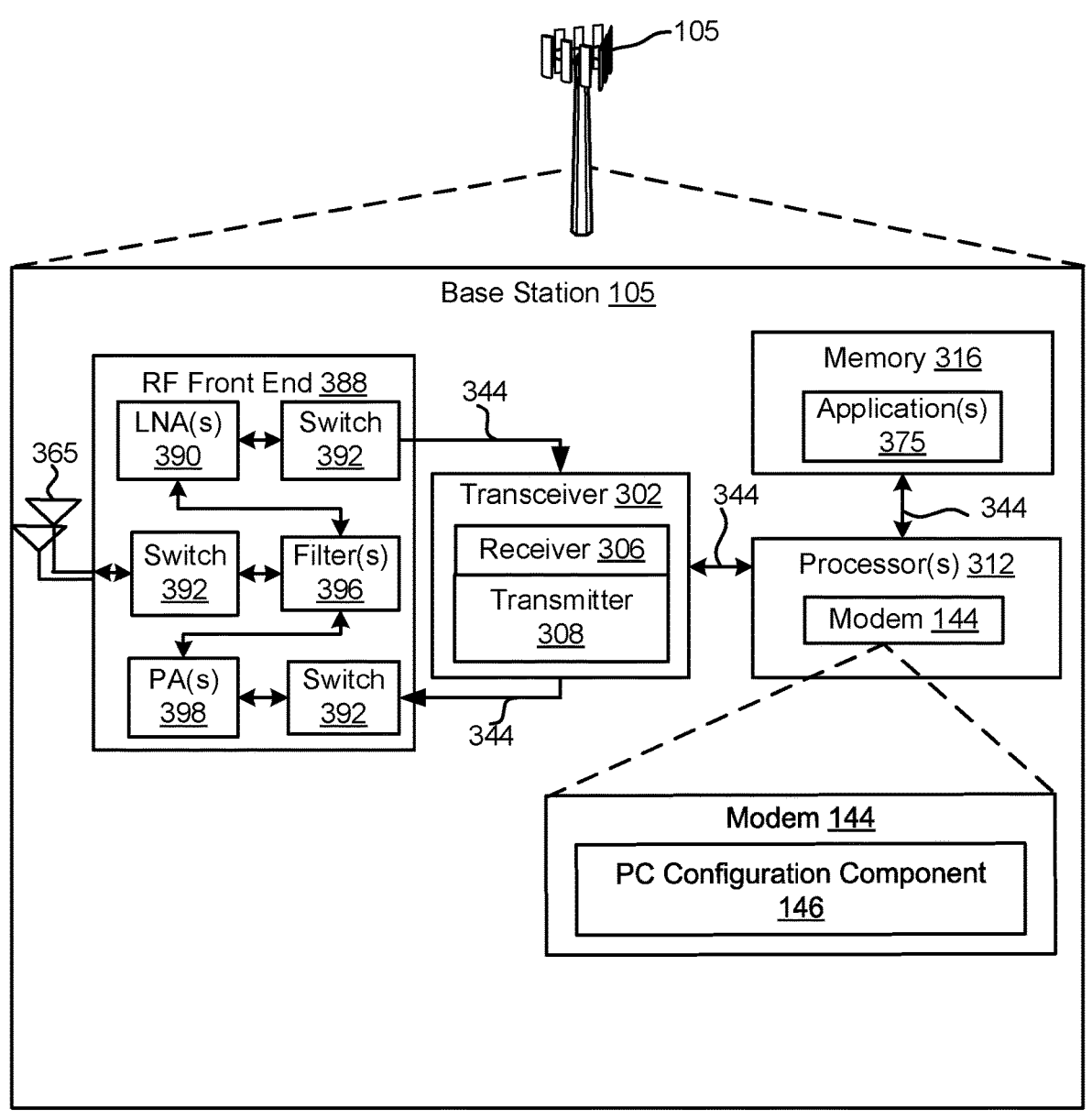
FIG. 3 is a schematic diagram of an example of a base station of FIG. 1, according to aspects of the present disclosure.

Referring to FIG. 3, an example implementation of a base station 105 may include a modem 144 having the PC configuration component 146. The modem 144 and/or PC configuration component 146 of the base station 105 may be configured to implement functions of configuring power control under unified TCI state indication, as described in further detail herein.

In some implementations, the base station 105 may include a variety of components, including components such as one or more processors 312 and memory 316 and transceiver 302 in communication via one or more buses 344, which may operate in conjunction with the modem 144 to enable one or more of the functions related to power control under unified TCI state indication, described herein. Further, the one or more processors 312, the modem 144, the memory 316, the transceiver 302, a RF front end 388, and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 144 that uses one or more modem processors. The various functions of the modem 144 and/or the processors 312 may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with the transceiver 302. Additionally, the modem 144 may configure the base station 105 and the processors 312. In other aspects, some of the features of the one or more processors 312 and/or the modem 144 may be performed by the transceiver 302.

Also, the memory 316 may be configured to store data used herein and/or local versions of applications 375, and/or one or more subcomponents of the modem 144 being executed by at least one processor 312. The memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the modem 144 and/or one or more of the subcomponents, and/or data associated therewith, when the base station 105 is operating at least one processor 312 to execute the modem 144 and/or one or more of the subcomponents.

The transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, an RF receiving device. In an aspect, the receiver 306 may receive signals transmitted by the UE 110. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter.

Moreover, in an aspect, the base station 105 may include the RF front end 388, which may operate in communication with one or more antennas 365 and the transceiver 302 for receiving and transmitting radio transmissions, for example, wireless communications transmitted by the base stations 105 or wireless transmissions transmitted by the UEs 110. The RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use one or more switches 392 to select a particular LNA 390 and the specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and the specified gain value based on a desired gain value for a particular application.

Also, for example, one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, the RF front end 388 may use one or more switches 392 to select a transmit or receive path using a specified filter 396, the LNA 390, and/or the PA 398, based on a configuration as specified by the transceiver 302 and/or the processor 312.

As such, the transceiver 302 may be configured to transmit and receive wireless signals through one or more antennas 365 via the RF front end 388. In an aspect, the transceiver 302 may be tuned to operate at specified frequencies such that the base station 105 may communicate with, for example, the UEs 110, the base station 105, or one or more cells associated with one or more of the base station 105. In an aspect, for example, the modem 144 may configure the transceiver 302 to operate at a specified frequency and power level based on the repeater configuration of the base station 105 and the communication protocol used by the modem 144.

In an aspect, the modem 144 may be a multiband-multimode modem, which may process digital data and communicate with the transceiver 302 such that the digital data is sent and received using the transceiver 302. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the base station 105 (e.g., RF front end 388, transceiver 302) to enable transmission and/or reception of signals from the network based on a specified modem configuration. In an aspect, the modem configuration may be based on the mode of the modem 144 and the frequency band in use. In another aspect, the modem configuration may be based on a repeater configuration associated with the base station 105.

For 5G NR technologies, different types of TCI states have been introduced, including a joint DL/UL common TCI state to indicate a common beam for at least one DL channel/reference signal (RS) and at least one UL channel/RS, a separate DL common TCI state to indicate a common beam for at least two DL channels/RSs, and a separate UL common TCI state to indicate a common beam for at least two UL channels/RSs.

[Issue 1] In NR, further enhanced multiple input/multiple output (FeMIMO) technologies on a unified TCI framework may support joint TCI for DL and UL based on and analogous to DL TCI framework. The term "TCI" may at least comprises a TCI state that includes at least one source RS to provide a reference (e.g., UE assumption) for determining quasi-colocated (QCL) and/or spatial filter information.

For unified TCI framework, to accommodate the case of separate beam indication for UL and DL, two separate TCI states may be utilized, one for DL and one for UL. For a separate DL TCI, the source reference signal(s) in M TCIs (where M is any integer greater than 0) provide QCL information at least for UE-dedicated reception on a physical DL shared channel (PDSCH) and for UE-dedicated reception on all or a subset of control resource sets (CORE-SETs) in a component carrier (CC). For a separate UL TCI, the source reference signal(s) in N TCIs (where N is any integer greater than 0) provide a reference for determining common UL transmission spatial filter(s) at least for dynamic-grant/configured-grant based on a physical UL shared channel (PUSCH) or all or a subset of dedicated physical UL control channel (PUCCH) resources in a CC. Optionally, the UL transmission spatial filter may also apply to all sounding RS (SRS) resources in a resource set(s) configured for antenna switching/codebook-based/non-codebook-based UL transmissions.

In an aspect, a pool of joint DL/UL TCI states may be used for joint DL/UL TCI state updates (e.g., beam indication). In an example, the pool may be utilized for separate DL and UL TCI state update (e.g., beam indication). The TCI state pool may refer to a pool configured via higher-layer signaling (e.g., radio resource control (RRC)(s). In another example, a joint TCI state may include UL specific parameter(s) such as UL PC/timing parameters, pathloss RS (PLRS) parameters, panel-related indication, etc, and if a UL specific parameter(s) is included, the UL specific parameter(s) may be used for UL transmission of the DL and UL transmission to which the joint TCI state is applied.

In an aspect, a UE may receive an indication either explicitly or implicitly of at least one set of multiple applicable channel(s)/RS(s) to which each type of TCI state may be applied. In an example, a TCI state may include the following types: Type 1—joint DL/UL common TCI state to indicate a common beam for at least one DL channel/RS plus at least one UL channel/RS; Type 2—separate DL common TCI state to indicate a common beam for at least two DL channel/RS; Type 3—Separate UL common TCI state to indicate a common beam for at least two UL channel/RS; Type 4—separate DL single channel/RS TCI state to indicate a beam for a single DL channel/RS; or Type 5—separate UL single channel/RS TCI state to indicate a beam for a single UL channel/RS.

In an aspect, a channel(s)/RS(s) applicable per TCI type may include a number of characteristics. For example, a channel/RS may include a UE specific or a non-UE specific PDCCH, PDSCH, PUCCH, PUSCH. In this example, a PDSCH/PUCCH/PUSCH may be dynamically scheduled by a DL control indicator (DCI), semi-statically activated by a DCI or a medium access control-control element (MAC-CE), or semi-statically configured by an RRC. The PDSCH may include, for example, a scheduling offset between a DCI and a PDSCH that is equal to or greater than a beam switch latency threshold, and/or a scheduling offset that is less than the threshold. The PDCCH may be carried by all or a subset of CORESETs.

In another example, a channel/RS may include a synchronized signal block (SSB), a periodic, a semi-periodic, or an aperiodic control channel state information RS (CSI-RS), or a periodic, a semi-periodic, or an aperiodic positioning RS (PRS). In this example, the purpose of CSI-RS may be for a CSI measurement/report (e.g., without higher layer parameter tracking RS (TRS) information and repetition), a beam measurement/report (with higher layer parameter repetition), and a TRS measurement (with higher layer parameter TRS information).

In another example, a channel/RS may include a periodic, a semi-periodic, or an aperiodic SRS. In this example, the purpose of a SRS may be for antenna switching, beam management, codebook based PUSCH, and non-codebook based PUSCH.

In these examples, the PUCCH, the SSB, the CSI-RS, the PRS, or the SRS may be all or a subset of corresponding configured resources.

In an aspect, the beam indication for various UL channels may indicated by unified TCI states, and power control configuration is different for the UL channels. For example, SRS power control information is per SRS set rather than per SRS resource, and TCI/beam indication is per SRS resource. In another example, PUCCH power control information is per beam. In another example, PUSCH power control information is per SRS resource indicator (SRI), where an SRI field in a non-codebook MIMO transmission may be for precoder indication, and an SRI field in codebook MIMO transmission may be for beam indication. Accordingly, conventionally power control configuration may be difficult with unified TCI states for different UL channels. The present disclosure may enable support for both unified TCI states and power control information configuration/indication.

Figure 4:
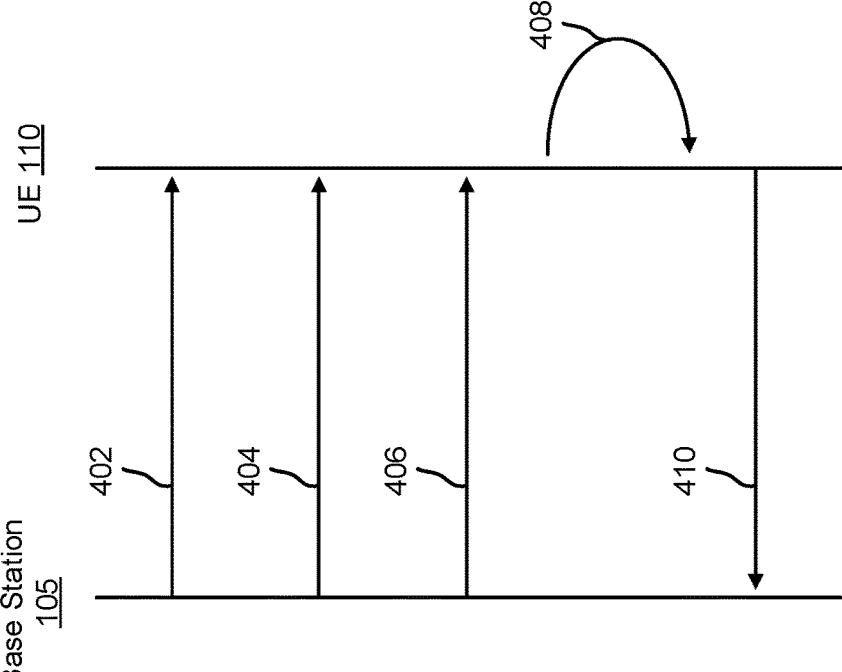
FIG. 4 is a call flow diagram of an example of wireless communications between the UE and base station of FIG. 1, according to aspects of the present disclosure.

Referring to FIG. 4, an example of power control configuration based on the unified TC state and the type of UL transmission is provided. In this example, the base station 105 may transmit to the UE 110 an RRC configuration signal 402 to configure communications between the base station 105 and the UE 110. The base station 105 may further transmit to the UE 110 a first message 404 to indicate a TCI state for the UE 110 to utilize, and a second message 406 indicating one or more power control parameters to trigger a UL transmission. In response, the UE 110 may perform a power control configuration process 408 to configure power control of the UL transmission 410 (e.g., PUSCH, PUCCH, or SRS) based on the configuration information from the first message 404 and the second message 406. After configuring, the UE 110 may transmit the UL transmission 410 to the base station 105 based on the TCI state and a power control parameter, indicated by the first message 404 and the second message 406, respectively. Thereby, the UL transmission may support both beam and power control parameters. Examples of configuring the UL transmissions according to the present disclosure are now provided.

In a first aspect, for power control information configuration for a PUSCH transmission including any of alpha, Po, cross-link interference (CLI), and/or PLRS, the PUSCH transmission may be configured based on both a unified TCI states and a SRI-PUSCH-PowerControl. In an example, the beam indication for the PUSCH transmission may be indicated by the first message 404 with at least a unified TCI state applicable to the PUSCH transmission, and the power control information for the PUSCH transmission is indicated by the second message 406 in, for example, an SRI field of the second message 406. In this example, the first message 404 may include a DCI (e.g., DL grant), and the second message 406 may include a MAC-CE or a DCI (e.g., UL grant).

In an example, for a non-codebook based UL MIMO transmission, the SRI indication may also determine the precoders to the PUSCH transmission.

In another example, for a codebook based UL MIMO transmission, the SRI indication may also select one SRS in an SRS set configured with usage as a "code-book," if multiple SRSs are configured in the SRS set. Otherwise, the UE 110 may select the only SRS in the SRS set. In this example, the UE may apply the UL TCI state associated with the selected SRS for the PUSCH transmission. In this example, each SRS resource may be mapped with multiple SRI values and each SRI value may be associated with a different power control information, where each SRI may identify one unique SRS resource.

In a second aspect, for power control information configuration to a PUCCH transmission, including any of alpha, Po, CLI and PLRS, the PUCCH may be configured based on both unified TCI states and PUCCH-spatial-relation-info, where the beam indication for the PUCCH transmission may be indicated by the first message 404 with a unified TCI state applicable to the PUCCH resource, and the power control information for the PUCCH transmission may be indicated by the second message 406 with a PUCCH-spatial-relation-info. In this example, the first message 404 may include a DCI (e.g., DL grant), and the second message 406 may include a MAC-CE or a DCI (e.g., UL grant).

In an example, the beam indication parameters such as serving cell index and reference signal index in the PUCCH-spatial-relation-info may be optional and may be ignored by the UE 110. In an example a reference signal index may be mandatory in PUCCH-spatial-relation-info.

In a third aspect, for power control information configuration for an SRS transmission (or SRS set), the SRS transmission may be configured based on both unified TCI states and power control settings including any of alpha, Po, CLI, or PLRS. In an example, the beam indication for SRS transmission may be indicated by the first message 404 with at least a unified TCI state applicable to each SRS of the SRS set or a whole SRS set, and the power control information for the SRS transmission may be indicated by the second message 406 with the power control settings to the SRS set. In this example, the first message 404 may include a DCI (e.g., DL grant), and the second message 406 may include a MAC-CE or a DCI (e.g., UL grant).

Referring to FIG. 5, an example of a method 500 for power control under unified TCI indication may be performed by the PC component 142, the modem 140, the transceiver 202, the processor 212, the memory 216, and or any other component/subcomponent of the UE 110 of the wireless communication network 100.

At block 502, the method 500 may include receiving, from a base station, first configuration information for beam indication of an uplink transmission and second configuration information for a power control parameter, wherein the beam indication for the uplink transmission is indicated by a unified TCI state corresponding to the uplink transmission. For example, the PC component 142, the modem 140, the transceiver 202, the processor 212, and/or the memory 216 of the UE 110, and/or one or more additional components/subcomponents of the UE 110 may be configured to or may comprise means for receiving, from a base station, first configuration information for beam indication of an uplink transmission and second configuration information for a power control parameter, wherein the beam indication for the uplink transmission is indicated by a unified TCI state corresponding to the uplink transmission.

For example, the receiving the first and second configuration information at block 502 may include receiving by the PC component 142, the modem 140, the transceiver 202, the processor 212, and/or the memory 216 of the UE 110, from the base station 105, the first message 404 including the first configuration information for beam indication of the uplink transmission 410 (e.g., PUSCH transmission, PUCCH transmission, or SRS transmission) of FIG. 4 and the second message 406 of FIG. 4 including the second configuration information for a power control parameter, wherein the beam indication for the uplink transmission is indicated by a unified TCI state corresponding to the uplink transmission. The first configuration information may be indicated to multiple uplink transmissions of the UE 110. The second configuration information may be dedicated to one uplink transmission of the UE 110.

In an example, the second configuration information may corresponds to a PUSCH configuration and the uplink transmission may include a PUSCH transmission. Further, the power control parameter may be indicated in one or more of a MAC-CE or a DCI. In another example, the power control parameter may be further indicated by an SRI field of the MAC-CE or the DCI. For example, the MAC-CE signaling may activate one pathloss reference signal for each codepoint of an SRI field in DCI. When one SRI codepoint is indicated in the DCI, the activated pathloss reference signal for the codepoint is indicated to the PUSCH transmission scheduled by the DCI.

In an example, the PUSCH transmission may include a non-codebook based UL MIMO transmission, and the one or more precoders for the PUSCH transmission is determined by the UE 110.

In another example, the PUSCH transmission includes a codebook based UL MIMO transmission, and an SRS from a SRS set is selected based on information in the SRI field. The SRS may be configured with usage for the codebook based MIMO transmission. Further, the UL TCI state of the unified TCI state may be associated with the SRS. Each SRS resource corresponding to the SRS set may be mapped with multiple SRI values, and each SRI value of the multiple SRI values may correspond to different power control information. For example, different pathloss reference signals may be activated for different SRI values by the MAC-CE signaling. Each SRI value may identify a different SRS resource.

In yet another example the second configuration information may correspond to a PUCCH configuration and the UL transmission may include a PUCCH transmission. In this example, the power control parameter may be indicated in one or more of a MAC-CE or a DCI. Further, the power control parameter may be indicated by spatial relation information of the MAC-CE or the DCI.

In an example, one or more beam indication parameters corresponding to a serving cell index or a reference signal index in the spatial relation information may be ignored by the UE 110.

In yet another example, the second configuration information may correspond to power control settings including one or more of an alpha parameter, a Po parameter, a PLRS parameter, or a CLI parameter and the UL transmission includes an SRS, wherein the TCI state may correspond to the SRS or an SRS set. Further, the power control parameter for the SRS transmission by the power control settings of the SRS set.

At block 504, the method 500 may include configuring power control of the uplink transmission based on the first configuration information and the second configuration information. For example, the PC component 142, the modem 140, the transceiver 202, the processor 212, and/or the memory 216 of the UE 110, and/or one or more additional components/subcomponents of the UE 110 may be configured to or may comprise means for configuring power control of the uplink transmission based on the first configuration information and the second configuration information.

For example, the configuring power control at block 504 may include configuring by the PC component 142, the modem 140, the transceiver 202, the processor 212, and/or the memory 216 of the UE 110, power control of the uplink transmission (e.g., PUSCH, PUCCH, or SRS) based on the first configuration information and the second configuration information, as illustrated by the power control configuration process 408 of FIG. 4. In the first configuration information, for example, the UE 110 may be configured with a list of TCI states by RRC signaling, and the UE 110 may be indicated with a TCI state identification (ID) that provides a common spatial filter determined by the reference signal in the TCI state ID for one or more UL transmissions of the UE110. For example, one unified TCI may be indicated for both the PUCCH and PUSCH transmissions of the UE110. In the second configuration information, for example, the UE 110 may be configured with a set of power control parameters by RRC signaling for individual UL transmissions respectively, and the UE 110 may be indicated with a set of power control parameters for each uplink transmission. For example, one set of power control parameters may be indicated for the PUCCH transmission of the UE110 and another set of power control parameters may be indicated for the PUSCH transmission of the UE110. In this way, the UE 110 may apply separate sets of power control parameters flexibly to the more than one UL transmissions with a common spatial filter indicated by the TCI. Moreover, the set of power control parameters for a UL transmission may be indicated jointly with a scheduling indication of the UL transmission to achieve more timely power control indication. For example, the set of power control parameters for a PUSCH transmission may be in an SRI field of the DCI scheduling the PUSCH.

At block 506, the method 500 may include transmitting, to the base station, the uplink transmission. For example, the PC component 142, the modem 140, the transceiver 202, the processor 212, and/or the memory 216 of the UE 110, and/or one or more additional components/subcomponents of the UE 110 may be configured to or may comprise means for transmitting, to the base station, the uplink transmission.

For example, the transmitting at block 506 may include transmitting by the PC component 142, the modem 140, the transceiver 202, the processor 212, and/or the memory 216 of the UE 110, to the base station 105, the uplink transmission 410.

Figure 6:
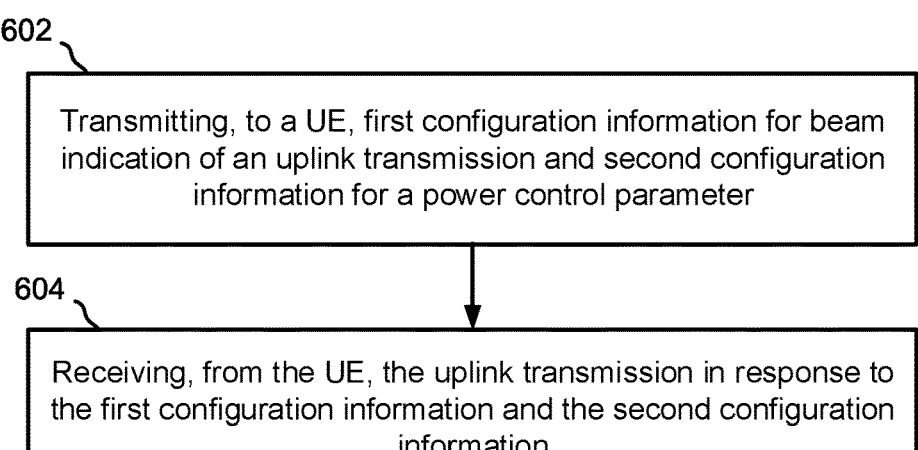
FIG. 6 is flowchart of another example method performed by the base station of FIG. 1, according to aspects of the present disclosure.

Referring to FIG. 6, an example of a method 600 for power control under unified TCI indication may be performed by the PC configuration component 146, the modem 144, the transceiver 302, the processor 312, the memory 316, and or any other component/subcomponent of the base station 105 of the wireless communication network 100.

At block 602, the method 600 may optionally include transmitting, to a UE, first configuration information for beam indication of a UL transmission and second configuration information for a power control parameter, wherein the beam indication for the UL transmission is indicated by a unified TCI state corresponding to the UL transmission. For example, the PC configuration component 146, the modem 144, the transceiver 302, the processor 312, and/or the memory 316 of the base station 105, and/or one or more additional components/subcomponents of the base station 105 may be configured to or may comprise means for transmitting, to a UE, first configuration information for beam indication of an uplink transmission and second configuration information for a power control parameter, wherein the beam indication for the uplink transmission is indicated by a unified TCI state corresponding to the uplink transmission.

For example, the transmitting the first and second configuration information by the base station 105 at block 602 may include transmitting, to the UE 110, the first message 404 including first configuration information for beam indication of the UL transmission 410 and the second message 406 including second configuration information for a power control parameter, wherein the beam indication for the uplink transmission is indicated by a unified TCI state corresponding to the UL transmission 410.

In an example, the second configuration information may correspond to a PUSCH configuration and the uplink transmission may include a PUSCH transmission. Further, the power control parameter may be indicated in one or more of a MAC-CE or a DCI. In another example, the power control parameter may be further indicated by an SRI field of the MAC-CE or the DCI.

In an example, the PUSCH transmission may include a non-codebook based UL MIMO transmission, and the one or more precoders for the PUSCH transmission may be determined by the UE 110.

In another example, the PUSCH transmission may include a codebook based UL MIMO transmission, and an SRS from a SRS set may be selected based on information in the SRI field. The SRS may be configured with usage as the codebook. Further, the UL TCI state of the unified TCI state may be associated with the SRS. Each SRS resource corresponding to the SRS set may be mapped with multiple SRI values, and each SRI value of the multiple SRI values may correspond to different power control information. Each SRI value may identify a different SRS resource.

In yet another example the second configuration information may correspond to a PUCCH configuration and the UL transmission may include a PUCCH transmission. In this example, the power control parameter may be indicated in one or more of a MAC-CE or a DCI. Further, the power control parameter may be indicated by spatial relation information of the MAC-CE or the DCI.

In an example, one or more beam indication parameters corresponding to a serving cell index or a reference signal index in the spatial relation information may be ignored by the UE 110.

In yet another example, the second configuration information may correspond to power control settings including one or more of an alpha parameter, a Po parameter, a PLRS parameter, or a CLI parameter and the UL transmission includes an SRS, wherein the TCI state may correspond to the SRS or an SRS set. Further, the power control parameter for the SRS transmission by the power control settings of the SRS set.

At block 604, the method 600 may include receiving, from the UE, the uplink transmission in response to the first configuration information and the second configuration information. For example, the PC configuration component 146, the modem 144, the transceiver 302, the processor 312, and/or the memory 316 of the base station 105, and/or one or more additional components/subcomponents of the base station 105 may be configured to or may comprise means for receiving, from the UE, the uplink transmission in response to the first configuration information and the second configuration information.

For example, the receiving the UL transmission by the base station 105 at block 604 may include receiving, from the UE 110, the UL transmission 410 in response to the first message 404 including the first configuration information and the second message 406 including the second configuration information.

Additional Implementations

An example method of wireless communication for a UE, comprising: receiving, from a base station, first configuration information for beam indication of an uplink transmission and second configuration information for a power control parameter, wherein the beam indication for the uplink transmission is indicated by a unified TCI state corresponding to the uplink transmission; configuring power control of the uplink transmission based on the first configuration information and the second configuration information; and transmitting, to the base station, the uplink transmission.

2. The above example method, wherein the second configuration information corresponds to a PUSCH configuration and the uplink transmission includes a PUSCH transmission, and wherein the power control parameter is indicated in one or more of a MAC-CE or DCI.

One or more of the above-example methods, wherein the power control parameter is further indicated by an SRI field of the MAC-CE or the DCI.

One or more of the above-example methods, wherein the PUSCH transmission includes a non-codebook based uplink MIMO transmission, and the method further comprises determining one or more precoders for the PUSCH transmission.

One or more of the above-example methods, wherein the PUSCH transmission includes a codebook based uplink MIMO transmission, and the method further comprises selecting an SRS from a SRS set based on information in the SRI field.

One or more of the above-example methods, wherein the SRS is configured with usage as the codebook.

One or more of the above-example methods, wherein an uplink TCI state of the unified TCI state is associated with the SRS.

One or more of the above-example methods, wherein each SRS resource corresponding to the SRS set is mapped with multiple SRI values, and each SRI value of the multiple SRI values corresponds to different power control information.

One or more of the above-example methods, wherein each SRI value identifies a different SRS resource.

One or more of the above-example methods, wherein the second configuration information corresponds to a PUCCH configuration and the uplink transmission includes a PUCCH transmission, and wherein the power control parameter is indicated in one or more of a MAC-CE or DCI.

One or more of the above-example methods, wherein the power control parameter is further indicated by spatial relation information of the MAC-CE or the DCI.

One or more of the above-example methods, wherein one or more beam indication parameters corresponding to a serving cell index or a reference signal index in the spatial relation information is ignored by the UE.

One or more of the above-example methods, wherein the second configuration information corresponds to power control settings including one or more of an alpha parameter, a P0 parameter, a PLRS parameter, or a CLI parameter and the uplink transmission includes a SRS transmission, wherein the TCI state corresponds to the SRS or an SRS set, and wherein the power control parameter for the SRS transmission may be indicated by the power control settings of the SRS set.

A second example method of wireless communication for a base station, comprising: transmitting, to a UE, first configuration information for beam indication of an uplink transmission and second configuration information for a power control parameter, wherein the beam indication for the uplink transmission is indicated by a unified TCI state corresponding to the uplink transmission; and receiving, from the UE, the uplink transmission in response to the first configuration information and the second configuration information.

The above example method, wherein the second configuration information corresponds to a PUSCH configuration and the uplink transmission includes a PUSCH transmission, and wherein the power control parameter is indicated in one or more of a MAC-CE or DCI.

One or more of the above-example methods, wherein the power control parameter is further indicated by an SRI field of the MAC-CE or the DCI.

One or more of the above-example methods, wherein the PUSCH transmission includes a non-codebook based uplink MIMO transmission.

One or more of the above-example methods, wherein the PUSCH transmission includes a codebook based uplink MIMO transmission, and an SRS from a SRS set based on information in the SRI field.

One or more of the above-example methods, wherein the SRS is configured with usage as the codebook.

One or more of the above-example methods, wherein an uplink TCI state of the unified TCI state is associated with the SRS.

One or more of the above-example methods, wherein each SRS resource corresponding to the SRS set is mapped with multiple SRI values, and each SRI value of the multiple SRI values corresponds to different power control information.

One or more of the above-example methods, wherein each SRI value identifies a different SRS resource.

One or more of the above-example methods, wherein the second configuration information corresponds to a PUCCH configuration and the uplink transmission includes a PUCCH transmission, and wherein the power control parameter is indicated in one or more of a MAC-CE or DCI.

One or more of the above-example methods, wherein the power control parameter is further indicated by spatial relation information of the MAC-CE or the DCI.

One or more of the above-example methods, wherein the second configuration information corresponds to power control settings including one or more of an alpha parameter, a P0 parameter, a PLRS parameter, or a CLI parameter and the uplink transmission includes an SRS transmission, wherein the TCI state corresponds to the SRS or an SRS set, and wherein the power control parameter for the SRS transmission may be indicated by the power control settings of the SRS set.

An example UE, comprising: a memory comprising instructions; and one or more processors communicatively coupled with the memory and configured to: receive, from a base station, first configuration information for beam indication of an uplink transmission and second configuration information for a power control parameter, wherein the beam indication for the uplink transmission is indicated by a unified TCI state corresponding to the uplink transmission; configure power control of the uplink transmission based on the first configuration information and the second configuration information; and transmit, to the base station, the uplink transmission.

The above example UE, wherein the second configuration information corresponds to a PUSCH configuration and the uplink transmission includes a PUSCH transmission, and wherein the power control parameter is indicated in one or more of a MAC-CE or DCI.

One or more of the above-example methods, wherein the second configuration information corresponds to a PUCCH configuration and the uplink transmission includes a PUCCH transmission, and wherein the power control parameter is indicated in one or more of a MAC-CE or DCI.

One or more of the above-example methods, wherein the second configuration information corresponds to power control settings including one or more of an alpha parameter, a P0 parameter, a PLRS parameter, or a CLI parameter and the uplink transmission includes an SRS transmission, wherein the TCI state corresponds to the SRS or an SRS set, and wherein the power control parameter for the SRS transmission may be indicated by the power control settings of the SRS set.

An example base station, comprising: a memory comprising instructions; and one or more processors communicatively coupled with the memory and configured to: transmit, to a UE, first configuration information for beam indication of an uplink transmission and second configuration information for a power control parameter, wherein the beam indication for the uplink transmission is indicated by a unified TCI state corresponding to the uplink transmission; and receive, from the UE, the uplink transmission in response to the first configuration information and the second configuration information.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication for a user equipment (UE), comprising:
   receiving, from a base station, a first message comprising first configuration information for beam indication of an uplink transmission and a second message comprising second configuration information for a power control parameter, wherein the beam indication for the uplink transmission is indicated by a unified transmission configuration indicator (TCI) state corresponding to the uplink transmission;
   configuring power control of the uplink transmission based on the first configuration information and the second configuration information; and
   transmitting, to the base station, the uplink transmission.

2. The method of claim 1, wherein the second configuration information corresponds to a physical uplink share channel (PUSCH) configuration and the uplink transmission includes a PUSCH transmission, and
   wherein the power control parameter is indicated in one or more of a medium access control-control element (MAC-CE) or downlink control information (DCI).

3. The method of claim 2, wherein the power control parameter is further indicated by a sounding reference signal (SRS) resource indicator (SRI) field of the MAC-CE or the DCI.

4. The method of claim 3, wherein the PUSCH transmission includes a non-codebook based uplink multiple in multiple out (MIMO) transmission, and the method further comprises determining one or more precoders for the PUSCH transmission.

5. The method of claim 3, wherein the PUSCH transmission includes a codebook based uplink multiple in multiple out (MIMO) transmission, and the method further comprises selecting an SRS from a SRS set based on information in the SRI field.

6. The method of claim 5, wherein the SRS is configured with usage as the codebook.

7. The method of claim 5, wherein an uplink TCI state of the unified TCI state is associated with the SRS.

8. The method of claim 5, wherein each SRS resource corresponding to the SRS set is mapped with multiple SRI values, and each SRI value of the multiple SRI values corresponds to different power control information.

9. The method of claim 8, wherein each SRI value identifies a different SRS resource.

10. The method of claim 2, wherein the second configuration information corresponds to a physical uplink control channel (PUCCH) configuration and the uplink transmission includes a PUCCH transmission, and wherein the power control parameter is indicated in one or more of a medium access control-control element (MAC-CE) or downlink control information (DCI).

11. The method of claim 10, wherein the power control parameter is further indicated by spatial relation information of the MAC-CE or the DCI.

12. The method of claim 11, wherein one or more beam indication parameters corresponding to a serving cell index or a reference signal index in the spatial relation information is ignored by the UE.

13. The method of claim 2, wherein the second configuration information corresponds to power control settings including one or more of an alpha parameter, a P0 parameter, a pathloss reference signal (PLRS) parameter, or a cross link interference (CLI) parameter and the uplink transmission includes a sounding reference signal (SRS) transmission, wherein the TCI state corresponds to the SRS or an SRS set, and wherein the power control parameter for the SRS transmission may be indicated by the power control settings of the SRS set.

14. A method of wireless communication for a base station, comprising:

transmitting, to a user equipment (UE), a first message comprising first configuration information for beam indication of an uplink transmission and a second message comprising second configuration information for a power control parameter, wherein the beam indication for the uplink transmission is indicated by a unified transmission configuration indicator (TCI) state corresponding to the uplink transmission; and receiving, from the UE, the uplink transmission in response to the first configuration information and the second configuration information.

15. The method of claim 14, wherein the second configuration information corresponds to a physical uplink share channel (PUSCH) configuration and the uplink transmission includes a PUSCH transmission, and wherein the power control parameter is indicated in one or more of a medium access control-control element (MAC-CE) or downlink control information (DCI).

16. The method of claim 15, wherein the power control parameter is further indicated by a sounding reference signal (SRS) resource indicator (SRI) field of the MAC-CE or the DCI.

17. The method of claim 16, wherein the PUSCH transmission includes a non-codebook based uplink multiple in multiple out (MIMO) transmission.

18. The method of claim 16, wherein the PUSCH transmission includes a codebook based uplink multiple in multiple out (MIMO) transmission, and an SRS from a SRS set based on information in the SRI field.

19. The method of claim 18, wherein the SRS is configured with usage as the codebook.

20. The method of claim 18, wherein an uplink TCI state of the unified TCI state is associated with the SRS.

21. The method of claim 20, wherein each SRI value identifies a different SRS resource.

22. The method of claim 21, wherein the power control parameter is further indicated by spatial relation information of the MAC-CE or the DCI.

23. The method of claim 18, wherein each SRS resource corresponding to the SRS set is mapped with multiple SRI values, and each SRI value of the multiple SRI values corresponds to different power control information.

24. The method of claim 15, wherein the second configuration information corresponds to a physical uplink control channel (PUCCH) configuration and the uplink transmission includes a PUCCH transmission, and wherein the power control parameter is indicated in one or more of a medium access control-control element (MAC-CE) or downlink control information (DCI).

25. The method of claim 15, wherein the second configuration information corresponds to power control settings including one or more of an alpha parameter, a P0 parameter, a pathloss reference signal (PLRS) parameter, or a cross link interference (CLI) parameter and the uplink transmission includes a sounding reference signal (SRS) transmission, wherein the TCI state corresponds to the SRS or an SRS set, and wherein the power control parameter for the SRS transmission may be indicated by the power control settings of the SRS set.

26. A user equipment (UE), comprising:

a memory comprising instructions; and one or more processors communicatively coupled with the memory and configured to:

receive, from a base station, a first message comprising first configuration information for beam indication of an uplink transmission and a second message comprising second configuration information for a power control parameter, wherein the beam indication for the uplink transmission is indicated by a unified transmission configuration indicator (TCI) state corresponding to the uplink transmission;

configure power control of the uplink transmission based on the first configuration information and the second configuration information; and transmit, to the base station, the uplink transmission.

27. The UE of claim 26, wherein the second configuration information corresponds to a physical uplink share channel (PUSCH) configuration and the uplink transmission includes a PUSCH transmission, and wherein the power control parameter is indicated in one or more of a medium access control-control element (MAC-CE) or downlink control information (DCI).

28. The UE of claim 26, wherein the second configuration information corresponds to a physical uplink control channel (PUCCH) configuration and the uplink transmission includes a PUCCH transmission, and wherein the power control parameter is indicated in one or more of a medium access control-control element (MAC-CE) or downlink control information (DCI).

29. The UE of claim 26, wherein the second configuration information corresponds to power control settings including one or more of an alpha parameter, a P0 parameter, a pathloss reference signal (PLRS) parameter, or a cross link interference (CLI) parameter and the uplink transmission includes a sounding reference signal (SRS) transmission, wherein the TCI state corresponds to the SRS or an SRS set, and wherein the power control parameter for the SRS transmission may be indicated by the power control settings of the SRS set.

30. A base station, comprising:

a memory comprising instructions; and one or more processors communicatively coupled with the memory and configured to:

transmit, to a user equipment (UE), a first message comprising first configuration information for beam indication of an uplink transmission and a second message comprising second configuration information for a power control parameter, wherein the beam indication for the uplink transmission is indicated by a unified transmission configuration indicator (TCI) state corresponding to the uplink transmission; and receive, from the UE, the uplink transmission in response to the first configuration information and the second configuration information.

\* \* \* \* \*